United States Patent [19]
Krawczyk

[11] Patent Number: 6,131,927
[45] Date of Patent: *Oct. 17, 2000

[54] HAND TRUCK FOR TRANSPORTING STACKED TRAYS

[75] Inventor: Joseph D. Krawczyk, Pinconning, Mich.

[73] Assignee: Magline, Inc., Pinconning, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,380

[22] Filed: Sep. 25, 1997

Related U.S. Application Data

[60] Provisional application No. 60/026,665, Sep. 27, 1996.

[51] Int. Cl.$^7$ ........................................................ B62B 1/00
[52] U.S. Cl. ............................... 280/47.29; 280/47.27; 280/652; 414/490
[58] Field of Search ............................. 280/47.27, 47.19, 280/47.24, 47.18, 47.28, 47.29, 639, 651, 652, 659; 414/490, 453–456

[56] References Cited

U.S. PATENT DOCUMENTS

| | | | |
|---|---|---|---|
| 618,629 | 1/1899 | Watts et al. | 414/456 |
| 2,554,091 | 5/1951 | Davis | 280/47.29 |
| 3,079,168 | 2/1963 | Monroe et al. | |
| 3,659,867 | 5/1972 | Curry | 280/47.27 |
| 3,997,182 | 12/1976 | Mortenson | |
| 4,185,853 | 1/1980 | Thurmond, Jr. | |
| 4,653,765 | 3/1987 | Smalley et al. | 280/47.2 |
| 5,104,135 | 4/1992 | Sheets | |
| 5,118,124 | 6/1992 | Storay et al. | 280/47.21 |
| 5,393,081 | 2/1995 | Mortenson | |
| 5,549,317 | 8/1996 | Dunkle | 280/652 |
| 5,803,471 | 9/1998 | DeMars et al. | 280/40 |

FOREIGN PATENT DOCUMENTS

| | | | |
|---|---|---|---|
| 227962 | 8/1959 | Australia | |
| 359981 | 4/1957 | Switzerland | 280/47.27 |

*Primary Examiner*—Brian L. Johnson
*Assistant Examiner*—David R. Dunn
*Attorney, Agent, or Firm*—Reising, Ethington, Barnes, Kisselle, Learman & McCulloch, P.C.

[57] ABSTRACT

A hand truck for carrying stacks of nested trays and other products has a vertically disposed back frame with an upper handle surface, supported for travel by a pair of rearward spaced apart wheels. The back frame provides a pair of side rails joined by horizontal brace rails. The hand truck further has an elongate nose plate pivotally connected to the lower ends of the side rails and foldable from an operable horizontal position to a stowed position swung up to lie in a plane substantially parallel to and adjacent the back frame. The nose plate has a back plate which fits between the side rails when the nose plate is swung up to stowed position. A hanger member securing to the nose plate and pivotally secured on the interior side of each side rail has a back flange extending angularly outwardly and providing a rigid abutment stop engaging the rear side of the side rail on which it mounts when the nose plate is swung to operative position.

15 Claims, 5 Drawing Sheets

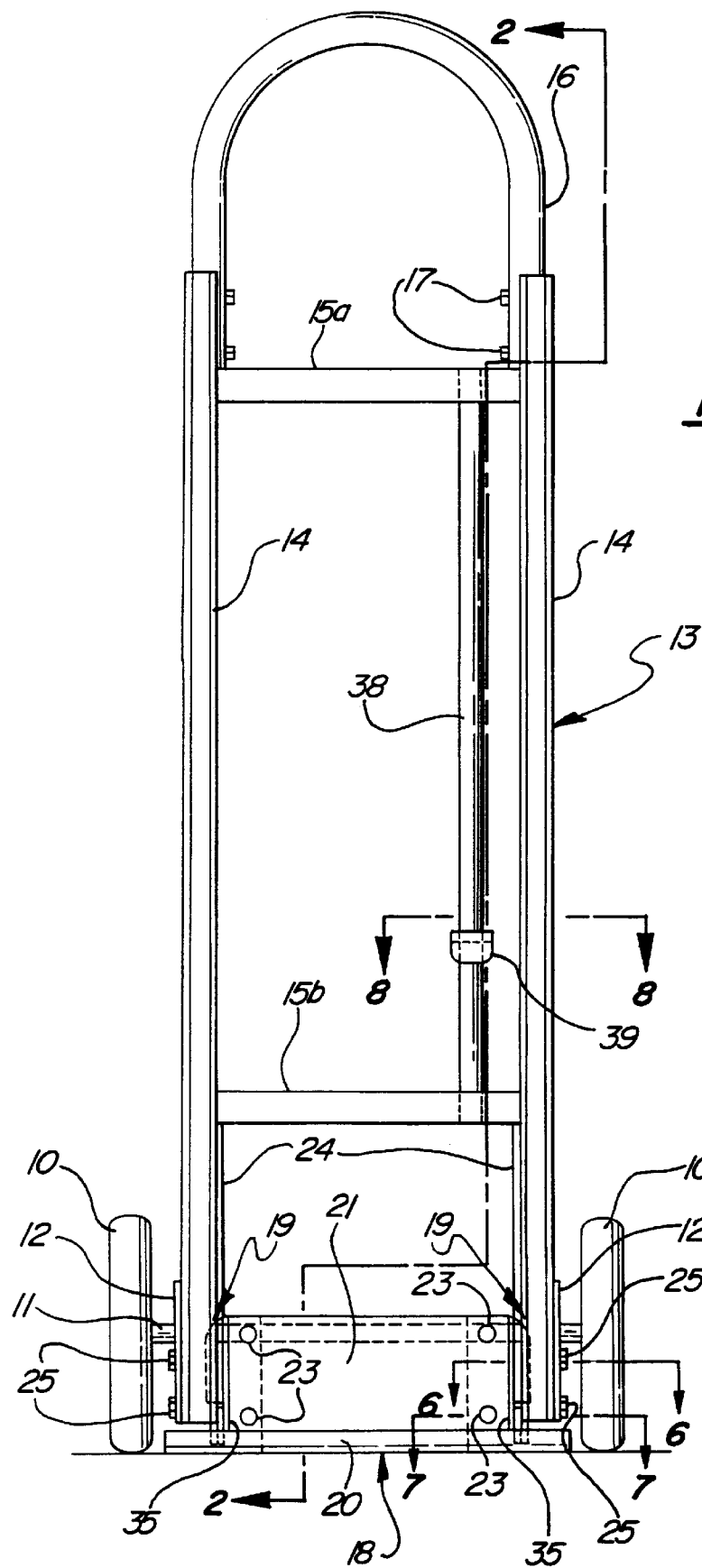

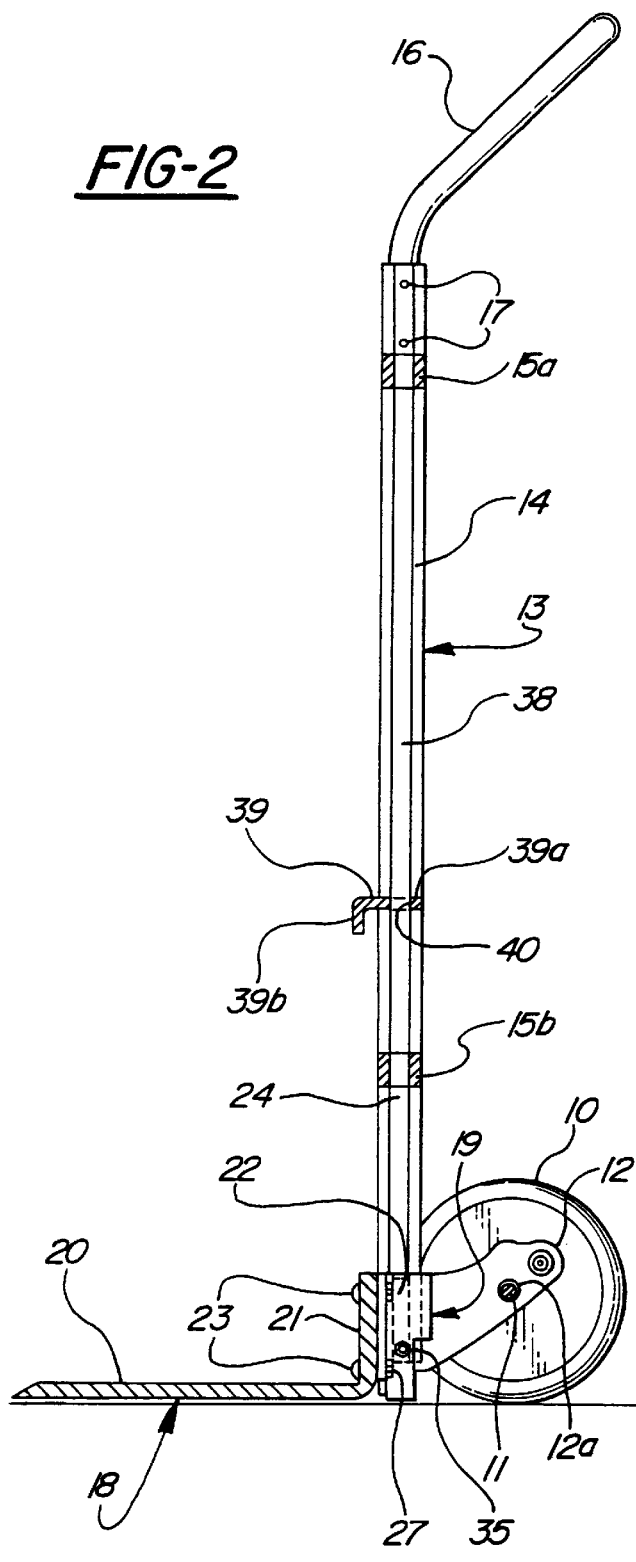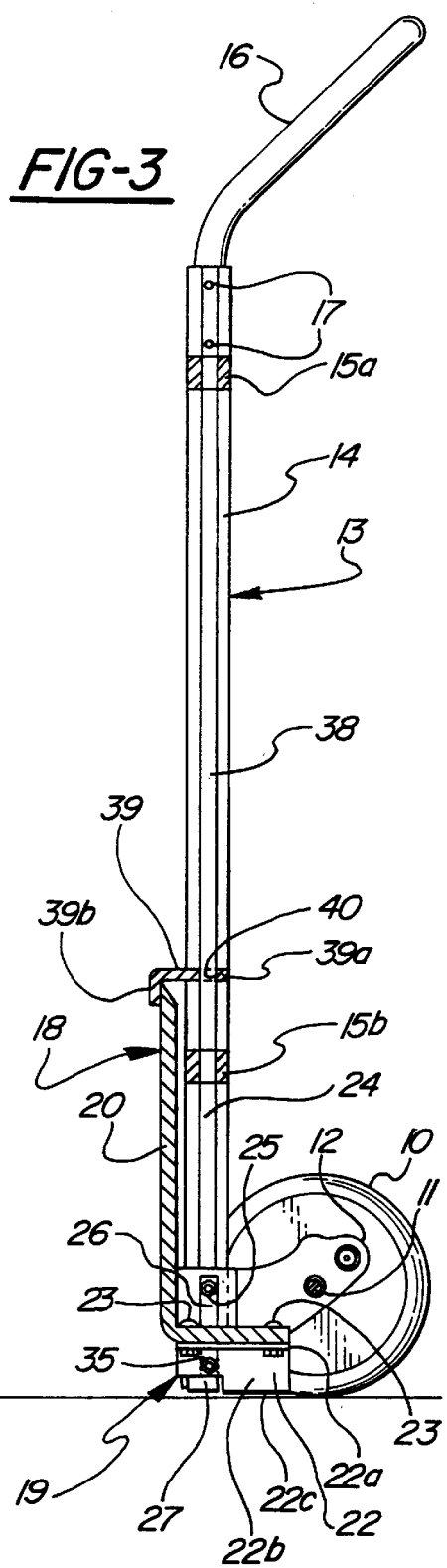

6,131,927

1

HAND TRUCK FOR TRANSPORTING STACKED TRAYS

This application claims the benefit of U.S. Provisional Application Ser. No. 60/026,665 filed Sep. 27, 1996.

This invention relates to two-wheeled trucks for use in loading and transporting stacked trays. The application claims the priority of provisional application Ser. No. 60/026,665 filed Sep. 27, 1997.

BACKGROUND OF THE INVENTION

Packaged baked goods are often placed in large, open-topped transport trays which are designed to be stackable in nested relation, one upon the other, while leaving sufficient room between adjacent trays to accommodate the baked goods. Such trays typically are several feet across in width and length and are fairly shallow in height. While a person is able to carry a few stacked trays by hand, it becomes much more difficult to handle the trays in this manner when a large and heavier stack of trays is involved.

The current practice for handling such large stacks of trays in the baked goods industry, to applicant's knowledge, is to load them onto the platform of a fork-lift truck, or onto a four-wheeled floor cart. However, the presently used equipment is fairly large and cumbersome when it comes time to store it, and when used to transport trays aboard a congested delivery vehicle of the type which is commonly used to deliver the baked goods to market. More maneuverable, conventional, two-wheeled hand trucks are not equipped to handle large stacks of such trays. Typically, the nose plate of such two-wheeled hand trucks extends forwardly of the side rails of the hand truck a distance far short of what is required to support such trays in a stable manner, and the trays would tip forwardly off the truck.

The present invention overcomes or greatly minimizes all the foregoing objections.

SUMMARY OF THE INVENTION

The invention is concerned with a two-wheeled hand truck having a nose plate that extends sufficiently forwardly of the side rails of the truck to support a stack of large baked goods trays in a stable fashion, and further provides a vertically positionable tray hook which is extendable from the frame of the truck to engage the edge of the top-most tray nearest the frame to secure the stack against forward tipping when it is supported on the nose plate. The vertical adjustment capability of the tray hook enables the hand truck to accommodate stacks of trays of different height, with the hook being moveable to any position along the frame to engage the uppermost tray.

The large nose plate and tray hook cooperate to provide the proper support and stability to the stack of trays which enables the operator to handle them in a safe and efficient manner.

According to another feature of the invention, the nose plate is mounted on a novel, frame-braced, rigidified hinge assembly and may be folded to a flush position against the frame when not in use. The tray hook uniquely has the capability of being moved from upper tray engaging position to a position to engage the end of the nose plate to secure it releasably in the folded position, lending further utility to the tray hook. The folded nose plate makes the hand truck more compact, enabling it to be more readily stored in a confined space, such as the cargo compartment of a delivery truck, or flush against a wall in a manufacturing or store setting, unlike the fork lift truck and four-wheeled cart mentioned previously.

2

Other features and advantages of the invention will become apparent with reference to the accompanying drawings and descriptive matter.

THE DRAWINGS

A presently preferred embodiment of the invention is illustrated in the accompanying drawings, wherein:

FIG. 1 is a front elevational view of a hand truck according to the invention, with the nose plate swung down to the use position;

FIG. 2 is a sectional, elevational view taken substantially along the line 2—2 of FIG. 1;

FIG. 3 is a view like FIG. 2 but with the nose plate folded to the stowed position;

DETAILED DESCRIPTION

Figure 4:
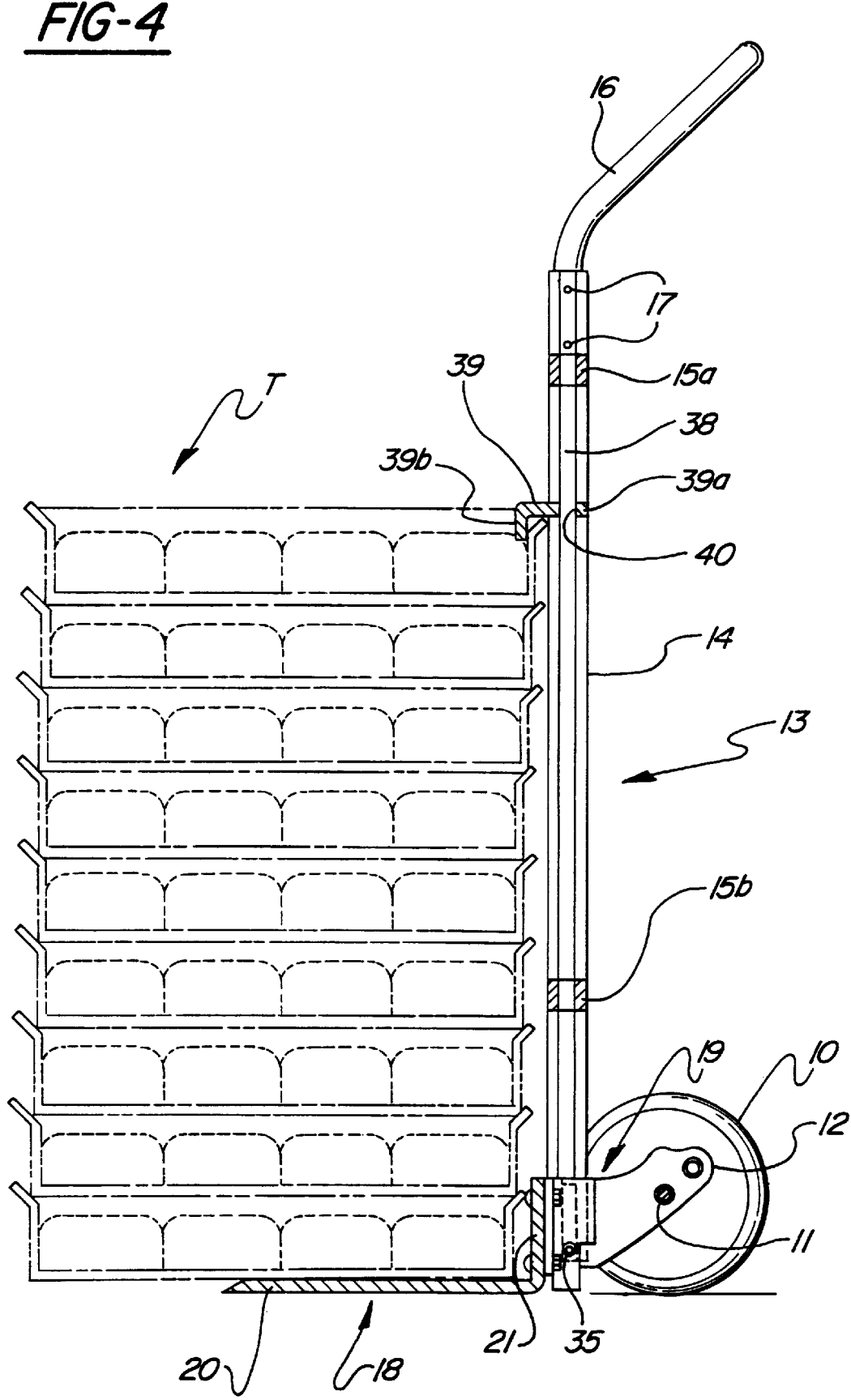
FIG. 4 is a view like FIG. 2, but showing the hand truck supporting a load of stacked trays.

Referring now more particularly to the accompanying drawings, it is to be understood that the hand truck involved is of the general character disclosed in U.S. Pat. No. 3,997,182, which is incorporated herein by reference. As in that patent, the hand truck which incorporates the subject matter of the present invention is shown as comprising a pair of preferably rubber-tired wheels 10 mounted on an axle 11. Brackets 12 have the usual hubs 12a for receiving the ends of axle 11 and extend forwardly to mount to the lower ends of the hand truck primary or back frame, generally designated 13 which, as shown, comprises an open framework made up of side rail members 14 connected by cross rail members or braces. In the present case there are two of such cross rail members, an upper one designated 15a and a lower one designated 15b. The side rails 14 are generally channel-shaped in cross section and include front and rear sides 14a and 14b, respectively, connected by a laterally outward web part 14c presenting laterally inwardly open channels. A bale-shaped handle member 16, which inclines rearwardly as shown in FIG. 2, has free ends which are received in the upper ends of the U-shaped side rails 14 and may be bolted therein as shown at 17 to function as a handle surface. Other types of handles such as handle grips on each side rail may also be used.

A generally L-shaped nose piece 18 is coupled to the lower ends of the side rails 14 by a pair of special identical hinge brackets or bracket assemblies, generally designated 19, and described in greater detail below. The angular nose piece 18 has an extended nose plate or platform portion 20 upon which a load to be transported by the hand truck may be supported, and a preferably unitary rear wall portion or back plate 21 that extends perpendicular to the platform 20 along its rear edge to fit between the side rails 14.

The hinge brackets 19 enable the nose plate 18 to hinge between an operative use position shown in FIGS. 1, 2 and 4, in which the platform 20 extends forwardly of the rails 14 and rear wall portion 21 projects upwardly in the longitudinal direction of the rails 14 and forwardly thereof, and an inoperative stowed position, as shown in FIG. 3, in which the platform 20 is folded upwardly against the front face 14*a* of the rails 14 and the rear wall portion 21 projects rearwardly beyond the rails 14.

Figure 5:
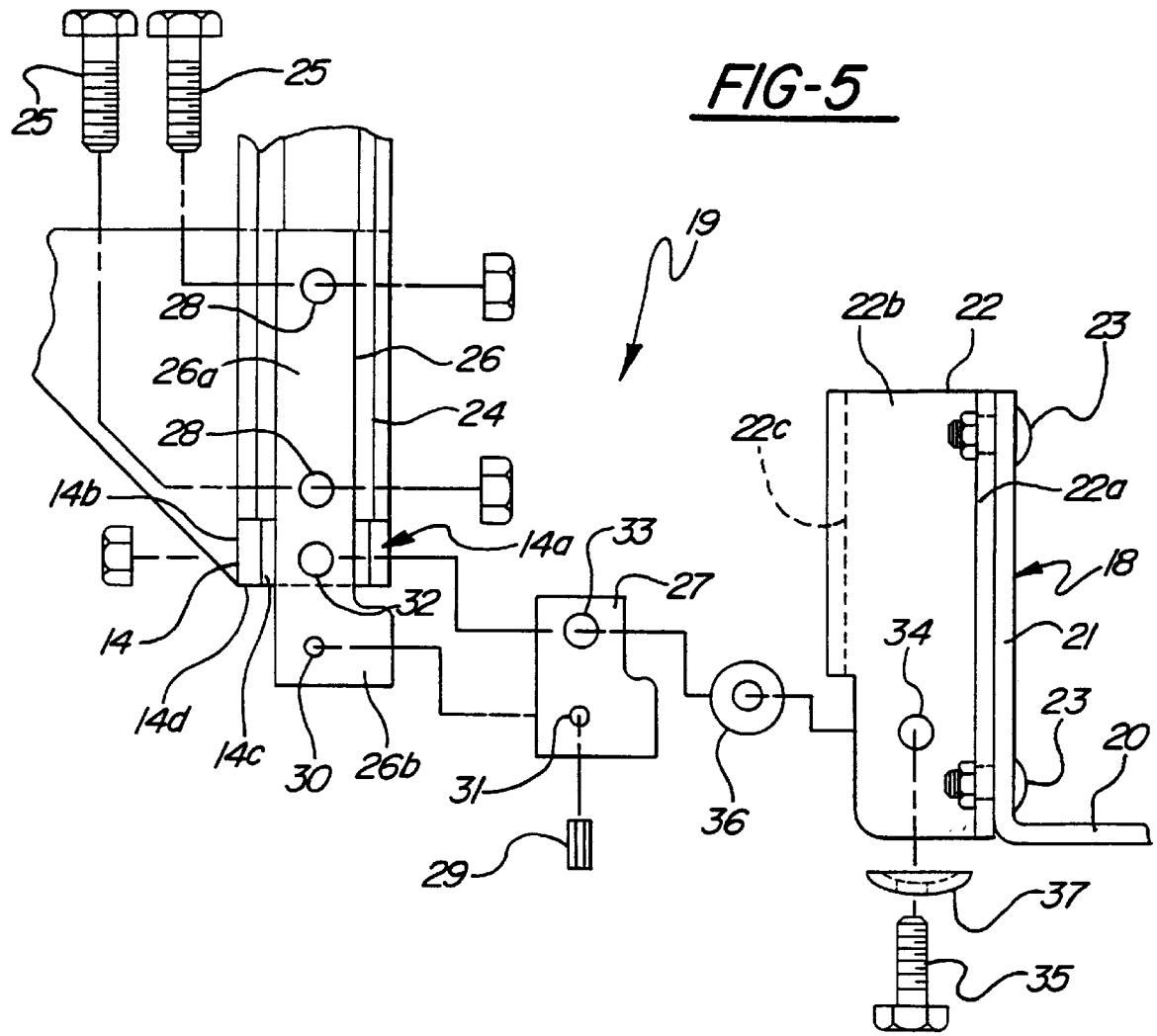
FIG. 5 is an exploded elevational view of the components of the hinge support assembly for the nose plate.
Figure 6:
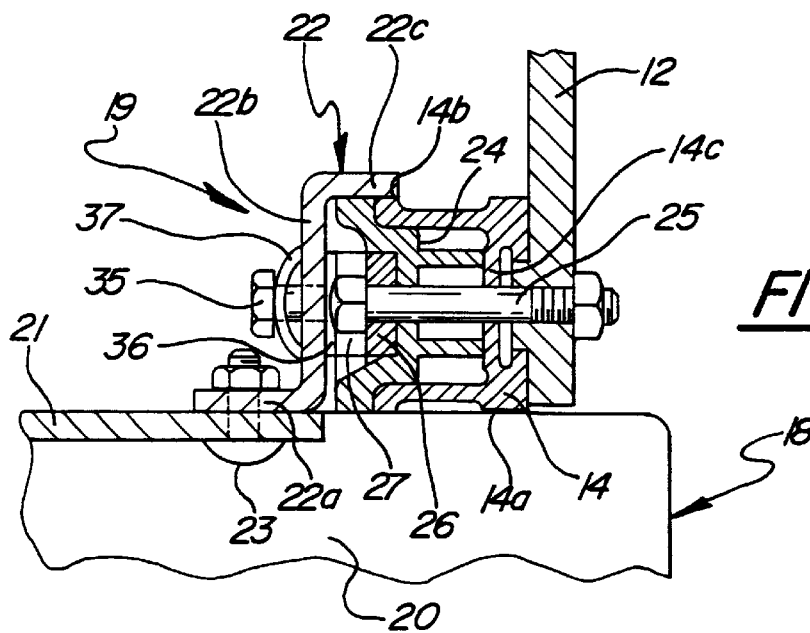
FIG. 6 is an enlarged fragmentary sectional view taken along the line 6—6 of FIG. 1.
Figure 7:
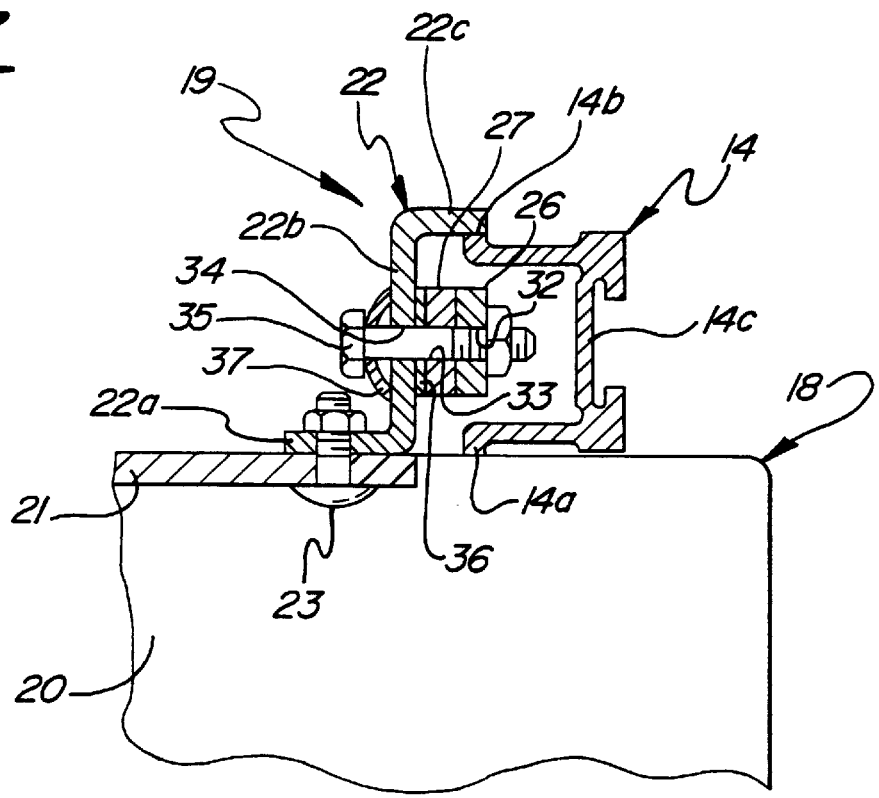
FIG. 7 is an enlarged fragmentary sectional view taken along the line 7—7 of FIG. 1.

A preferred construction of the hinge bracket assemblies 19 is illustrated in the drawings, with particular attention being drawn to FIGS. 5, 6, and 7. Each bracket assembly 19 includes a hinge plate or hanger member 22 that is generally S-shaped in cross section, as shown best in FIGS. 6 and 7. A forward leg or flange section 22*a* of each hanger plate or member 22 extends laterally inwardly of the adjacent side rail 14 along the rear wall portion 21 of the nose plate 18 and is secured thereto by bolts 23. A connecting web section 22*b* extends from forward leg section 22*a* rearwardly across the inboard side of the adjacent rail 14 and terminates in a rear or back leg or back flange section 22*c*. Each rear leg section 22*c* projects in abutting relation laterally outwardly behind the adjacent side rail 14 when the nose plate is in operative position and functions as a stop abutment to rigidly brace the nose plate when trays are loaded thereon.

Mounted within the open channels of the side rails 14 by the same bolts 25 that mount the wheel brackets 12, are extruded fitting strip members or fittings 24 that extend from a position just above a lower marginal edge 14*d* of the side rails 14 (see FIG. 5) to a position just below the lower-most cross rail 15*b* (FIG. 1). Fitted within an inward recess of each strip member 24 (FIG. 6) are laterally outer and inner hinge mount spacer plates 26, 27, respectively, which may be collectively referred to as a bracket. The outer plate 26 has a vertically elongate mounting portion 26*a* formed with apertures 28 to receive the mounting bolts 25 which secure the plates 26 immovably to the rails 14, as shown best in FIGS. 6 and 7. A lower portion 26*b* of each plate 26 projects downwardly beyond the bottom of the strip members 24 and the lower margin 14*d* of the side rails 14, and has a portion projecting forwardly to a location generally vertically flush with the front 14*a* of the side rails 14 (see FIGS. 5 and 6). Each inner spacer plate 27 overlies and is of the same configuration as the projecting portion 26*b* and is fixed thereto by means such as a compressible roll pin 29, as illustrated in FIG. 5, which is extended through corresponding apertures 30, 31, provided in plates 26 and 27 respectively. It is to be understood that plate 27 could instead be welded or made as a unitary portion of the plate 26.

Figure 8:
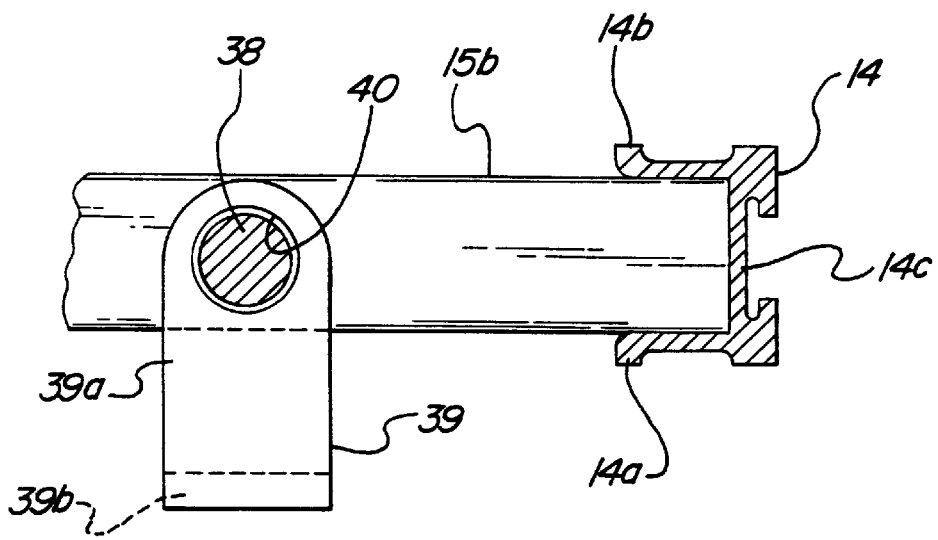
FIG. 8 is an enlarged fragmentary sectional view taken along the line 8—8 of FIG. 1.

Above apertures 30,31 in the plates 26 and 27 respectively, are another set of apertures 32,33 that align with an aperture 34 in the hinge or plate 22, as shown in FIGS. 7 and 8, to receive a pivot fastener 35 therein. A flat washer 36 is provided between each plate 27 and its associated connecting portion 22*b* (FIG. 7) to provide clearance between the pivot plates 22 and the fitting strips 24 (FIG. 6). A Belleville washer or spring 37 is provided between the head of each fastener 35 and the connecting portion 22*b* to provide frictional resistance to pivoting movements of the nose plate 18 about the axis of the fasteners 35.

The hand truck is equipped with a vertically extending load-stabilizing slide guide in the form of a rod or shaft 38 that is fitted to the frame 13 between the side rails 14 by securing the ends of the rod 38 between the upper 15*a* and lower 15*b* cross rail members. An L-shaped tray hook or releasable retainer member 39 is supported by the rod for vertical sliding movement along its length between the upper and lower cross rails 15*a*, 15*b*. As shown best in FIGS. 4 and 8, the tray hook 39 has a horizontal leg portion 39*a* formed with an aperture 40 through which the rod 38 extends for retaining the hook 39 on the rod 38. The diameter of the aperture 40 is relatively larger than the diameter of the rod 38 so as to allow the tray hook 39 to slide freely along the rod as well as to pivot or swivel about the axis of the rod 38. The tray hook 39 has a downwardly turned latch portion 39*b* at the free end of its horizontal portion 39*a* which is spaced forwardly of the front side 14*a* of the rails 14 when the hook is extended forwardly as illustrated in FIGS. 4 and 8.

THE OPERATION

As shown in FIG. 4, the hand truck is particularly adapted for handling large stacks of shallow bakery trays T of the type described with product such as rolls or loaves therein. To load such a stack T, an operator simply pivots the nose plate 18 downwardly to the use position which brings the rear leg portion 22*c* of the pivot brackets 22 into abutting engagement with the rear sides 14*b* of the side rails 14, as illustrated in FIGS. 4, 6 and 7. Such engagement by the rear leg portions 22*c* serves to brace the weightbearing nose plate in the use position. As shown in FIG. 4, the length by which the platform 20 extends forwardly of the rails 14 is sufficiently great to extend beyond the center of gravity of the stack T. For typical baked goods trays, a platform 20 having a length of 18 to 24 inches is deemed sufficient, although other lengths are contemplated by the invention.

Once the stack T is loaded to the platform 20, the operator may slide the tray hook 39 along the rod 38 to the top of the stack and then swing the hook 39 forwardly from an inoperative rearward position to extend the latch portion 39*b* to hook over the edge of the wall of the upper-most tray nearest the rails. As shown in FIG. 4, this effectively locks the stack T against the rails 14 and prevents it from tipping forwardly off the truck during transport. It will be appreciated that the free sliding movement of the tray hook 39 allows the hand truck to accommodate taller or shorter stacks than that illustrated in FIG. 4, as the case may be.

Once the stack T is locked by the hook 39, the operator may rock the hand truck rearwardly on its wheels 10 in order to lift the stack T off of the ground and transport it to a desired location.

To unload the stack, the operator simply rocks the hand truck forwardly to position the nose plate 18 on the floor. The tray hook 39 may then be slid upwardly to release the stack T and swiveled to inoperative position before releasing it. The truck may then be drawn rearwardly to withdraw the platform 20 from beneath the stack.

When not in use, the hand truck 10 may be stowed flush against a wall, or within the cargo bay, of a delivery truck by simply pivoting the nose plate 18 upwardly to the stowed position illustrated in FIG. 2 which brings the platform 20 generally flush against the rails 14 and the wall portion 21 level with the ground forwardly of the wheels 10 to help to stabilize the hand truck against forward tipping. As also shown in FIG. 3, the nose plate 18 is then locked in the stowed position by simply sliding and swiveling the dual function tray hook 39 into hooking engagement with the upper edge of the platform 20.

It is to be understood that other embodiments of the invention which accomplish the same function are incorporated herein within the scope of any ultimately allowed patent claims.

I claim:

1. In a hand truck for carrying stacks of product containing nested trays and other products and having an elongated generally vertically disposed back frame with an upper handle surface, supported for travel by a pair of rearward spaced apart wheels, the back frame comprising a pair of side rails with upper and lower ends and vertically extending front, rear, interior and exterior sides joined by vertically spaced generally horizontal brace rails, the hand truck further having a pivotally mounted elongate nose plate having an outer edge and pivotally connected to said lower ends of said side rails and foldable from an operable position in which said noseplate extends generally horizontally in a plane substantially perpendicular to said back frame to a stowed position swung up to lie in a plane substantially parallel to and adjacent said back frame, the nose plate having a laterally extending back plate which is vertically disposed when the nose plate is in operative position; the improvement wherein:

a. a hanger member having a back flange projecting angularly is pivotally secured on each side rail and has a front portion securing to the back plate of the nose plate to pivotally mount said nose plate to said side rails; each back flange extending laterally and providing a rigid vertically extending abutment stop engaging the vertically extending rear side of the side rail when the nose plate is swung to operative position;

b. said hanger member being pivotally mounted to said side rail at a vertical location to permit said back flange to swing from a generally horizontal position when said nose plate is in operative position to a vertical position when said nose plate is in vertical stowed position.

2. The further improved hand truck of claim 1 wherein said back frame mounts a slide guide between said side rails extending vertically from a position near the upper end of said back frame to the position of the outer edge of the nose plate when the nose plate is in vertical stowed position, and a releasable retainer member is slideable vertically on said guide from a position engageable with the upper tray of a stack of nested trays when the hand truck is in use to a lower dual function position in which said retainer member is engageable with said outer edge of the nose plate when the latter is in stowed position.

3. The further improved hand truck of claim 2 wherein said guide is a shaft on which said retainer member is revolvable, and said retainer member includes a hook swivelable from a forward retaining position to a non-engaging inoperative position.

4. The further improved hand truck of claim 1 in combination with a vertical stack of nested trays having a center of gravity, the nose plate extending forwardly well beyond said center of gravity, and extending laterally in front of said side rails.

5. The further improved hand truck of claim 1 wherein said side rails are generally channel shaped in cross-section and a fastener receiving fitting is received in and interfits with each side rails, each said fitting having a recess therein in its exposed face, a bracket received in each said recess to rigidly interfit therewith, a fastener extending to anchor each said bracket and fitting to each said side rail, and a pivot pin for pivotally securing one of said hanger members on each said bracket and each said side rail.

6. The further improved hand truck of claim 5 wherein a friction creating spring device is mounted to tend to hold said hanger member and thereby said nose plate in said nose plate's stowed and operative positions.

7. The further improved hand truck of claim 1 wherein said hanger member is generally S-shaped in cross section and incorporates a front flange facially engaging said nose plate back plate.

8. The hand truck of claim 1 wherein said back plate is of a width to fit between said side rails when the nose plate is swung up to stowed position so that said back plate extends generally horizontally between said side rails; each said hanger member being pivotally secured on the flanges extending laterally outwardly.

9. In a hand truck for carrying stacks of product containing nested trays and other products, and having a generally vertically disposed elongate frame with an upper handle surface supported for travel by a pair of rearward transversely spaced apart wheels mounted on an axle, the frame comprising a pair of side rails, forwardly extending brackets mounted on said axle and extending forwardly to connect to said side rails, said side rails having upper ends and terminating in linear vertical lower ends and providing generally vertical front faces extending in a common substantially vertical plane, and vertically spaced spanning brace rails, the hand truck further having a pivotally mounted forwardly extending elongate nose plate having an outer edge and having an inner edge pivotally connected to said lower ends of said side rails and foldable from an operable position in which said nose plate extends in a plane substantially perpendicular to said lower ends of said siderails to a vertical stowed position swung up to lie in a plane substantially parallel to and forwardly of said front faces of said side rails; the improvement wherein:

a. pivots carried by said side rails are positioned to swing said nose plate from said operable position to said vertical stowed position in which said nose plate is vertically aligned with said side rails and extends in a plane spaced forwardly of said front faces of said side rails.

b. a slide guide is mounted by said frame between said side rails to extend vertically from a position near the upper end of said frame to the vertical position of said outer edge of said nose plate when said nose plate is in stowed position; and c. a releasable retainer slide member on said slide guide comprises a slide body portion with a forwardly extending portion having a dependent latch portion spaced a predetermined distance forwardly of said side rails forwardly of said plane of said nose plate, said body portion being mounted on said slide guide to slide vertically on said, guide from a position in which said latch portion is engageable with the upper tray of a stack of nested trays when the hand truck is in use to a lower dual function position in which said latch portion is engageable with and latches over said outer edge of the nose plate when the latter is in vertical stowed position.

10. The further improved hand truck of claim 9 wherein said guide is a shaft and said retainer member comprises a hook pivotable on said shaft from a forward hooking position to a non-engaging inoperative position.

11. The further improved hand truck of claim 9 wherein said shaft extends between a pair of said brace rails.

12. A method of constructing an improved hand truck for carrying stacked nested trays and other products comprising:

a. providing a hand truck comprising a generally vertically disposed elongate frame having a pair of side rails, with vertically extending front, rear, interior, and exterior sides and upper and lower ends, joined by vertically spaced generally horizontal side rails spanning the side rails, the hand truck further having an elongate nose plate with an outer end pivotally connected to said lower ends of said side rails and foldable from an operable position in which said nose plate extends in a generally horizontal plane substantially perpendicular to said frame to a vertical stowed position swung up to lie in a plane substantially parallel to said frame, the hand truck further including a laterally extending back plate for said nose plate which is vertically disposed when said nose plate is in operative position and being of a width to fit between said side rails when said nose plate is swung up to stowed position so that it extends rearwardly between said side rails in the stowed position; the improvement comprising:

b. providing a hanger members having a back flange projecting laterally angularly, to be pivotally secured on the interior side of each side rail, said hanger member having a front portion adapted to be secured to the said back plate for the nose plate, said back flange extending laterally outwardly for providing a rigid vertically extending abutment stop engaging the vertical rear side of the side rail on which each said hanger member is mounted when said nose plate is swung down to operative position; and c. securing said front portion of each said hanger members to said back plate and pivotally mounting each said hanger member on said side rail at a vertical location to permit said back flange to swing from a generally horizontal position when said nose plate is in generally horizontal operative position to a vertical position when said noseplate is swung to vertical stowed position.

13. The method of claim 12 comprising pivotally securing said hanger member by extending a pin bolt through to said side rail and providing a spring washer on said pin bolt to tend to hold said hanger member and thereby said nose plate in each of its stowed and operative positions.

14. The method of constructing an improved hand truck as defined in claim 12 comprising:

a. mounting a slide guide on said frame between said frame side rails to extend vertically from a position near the upper end of said frame to the position of said outer end of said nose plate when said nose plate is in stowed position; and b. mounting a releasable retainer hook on said guide so as to be slideable and swivelable thereon, and to be moveable vertically on said guide from a position engageable with the upper tray of a stack of nested trays when the hand truck is in operative position to a lower dual function position in which it is engageable with the outer edge of said nose plate to hold said nose plate in stowed position when said nose plate has been swung up to stowed position.

15. A method of transporting a stack of product containing nested trays including an uppermost tray with a top edge on a two-wheeled hand truck comprising a generally vertically disposed elongate frame having an upper and lower end provided with an upper handle surface and supported for travel by a pair of rearward laterally spaced apart wheels mounted on said axle, the frame comprising a pair of side rails and forwardly extending brackets mounted on said axle and extending forwardly to mount to said side rails, said side rails having upper ends and terminating in linear vertical lower ends, with front, rear, interior, and exterior vertical sides, joined by vertically spaced generally horizontal brace rails, the hand truck further having an elongate nose plate with an outer edge extending forwardly in an operable position beyond the center of gravity of the trays stacked thereon and an inner end so pivotally connected to the linear lower ends of said side rails to be foldable from said operable position in which said nose plate extends in a plane substantially perpendicular to said frame to a vertical stowed position swung up to lie in a vertical plane substantially parallel to and spaced forwardly of said frame, said frame mounting a slide guide laterally between said side rails which extends vertically from a position near said upper end if said frame to the vertical position of said outer edge of said nose plate when said nose plate is in vertical stowed position, and there being a releasable hook retainer member having a dependent latch part spaced forwardly of said front sides of said side rails forwardly of said vertical plane of said nose plate when the nose plate is in stowed position and shiftable vertically on said guide, comprising:

a. loading the stack of nested trays to said nose plate of the hand truck when said nose plate is in operative position;

b. moving said releasable retainer hook member on said guide to a position above the stack of trays and lowering it to a position in which said latch part hooks over the top edge of the uppermost tray to retain said stack of trays when said stack of trays when said frame is tilted for transport;

c. transporting said stack and when said stack of trays has been transported, raising said latch part of said hook member to release said upper end of said stack of trays;

d. unloading said stack of trays from said nose plate; and e. swinging said nose plate upwardly to a vertical stowed position and lowering said hook member along said slide guide and positioning said latch part to hook over said outer edge of the stowed nose plate and hold it in stowed position.

\* \* \* \* \*